(12) United States Patent
Imazato et al.

(10) Patent No.: US 11,339,285 B2
(45) Date of Patent: May 24, 2022

(54) MULTILAYER BODY

(71) Applicant: TEIJIN LIMITED, Osaka (JP)

(72) Inventors: Kenta Imazato, Osaka (JP); Shoichi Maekawa, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 295 days.

(21) Appl. No.: 16/482,037

(22) PCT Filed: Jan. 30, 2018

(86) PCT No.: PCT/JP2018/002965
§ 371 (c)(1),
(2) Date: Jul. 30, 2019

(87) PCT Pub. No.: WO2018/143194
PCT Pub. Date: Aug. 9, 2018

(65) Prior Publication Data
US 2019/0352502 A1    Nov. 21, 2019

(30) Foreign Application Priority Data

Feb. 3, 2017  (JP) .............................. JP2017-018359

(51) Int. Cl.
| | | |
|---|---|---|
| *C08L 69/00* | (2006.01) | |
| *B32B 27/08* | (2006.01) | |
| *B32B 27/30* | (2006.01) | |
| *B32B 27/36* | (2006.01) | |

(52) U.S. Cl.
CPC .............. *C08L 69/00* (2013.01); *B32B 27/08* (2013.01); *B32B 27/308* (2013.01); *B32B 27/365* (2013.01); *B32B 2250/03* (2013.01); *B32B 2250/24* (2013.01); *B32B 2270/00* (2013.01); *B32B 2307/412* (2013.01); *B32B 2307/536* (2013.01); *B32B 2307/714* (2013.01)

(58) Field of Classification Search
CPC ....... C08L 69/00; B32B 27/08; B32B 27/308; B32B 27/365; B32B 2250/03; B32B 2250/24; B32B 2270/00; B32B 2307/412; B32B 2307/536; B32B 2307/714
See application file for complete search history.

(56) References Cited

U.S. PATENT DOCUMENTS

| | | | | |
|---|---|---|---|---|
| 2012/0232198 A1* | 9/2012 | Sasaki | ...................... | C08L 69/00 524/186 |
| 2012/0238679 A1* | 9/2012 | Sasaki | ...................... | C08L 69/00 524/186 |
| 2012/0245266 A1* | 9/2012 | Yokogi | ................... | C08L 69/00 524/186 |
| 2013/0331527 A1* | 12/2013 | Yokogi | .............. | C08G 64/0208 525/469 |

(Continued)

FOREIGN PATENT DOCUMENTS

| | | |
|---|---|---|
| CN | 105980156 | 9/2016 |
| JP | 2006-36954 | 2/2006 |

(Continued)

OTHER PUBLICATIONS

Polymer Properties Database (https://polymerdatabase.com/polymer%20physics/Fox.html; Fox Equation; T.G. Fox, Bull. Am. Phys. Soc. 1, 123 (1956)). (Year: 1956).*
English translation of the International Preliminary Report on Patentability dated Aug. 6, 2019 in corresponding (PCT) Application No. PCT/JP2018/002965.

(Continued)

*Primary Examiner* — Travis M Figg
(74) *Attorney, Agent, or Firm* — Wenderoth, Lind & Ponack, L.L.P.

(57) ABSTRACT

A multilayer body includes at least one layer (C) including a resin composition; and at least one layer (D) including a thermoplastic resin, in which the resin composition includes a polycarbonate resin (A) and an acrylic resin (B) in a weight ratio of 40:60 to 99:1, the polycarbonate resin (A) includes, as main repeating units, a unit (a-1) represented by the following formula (a-1):

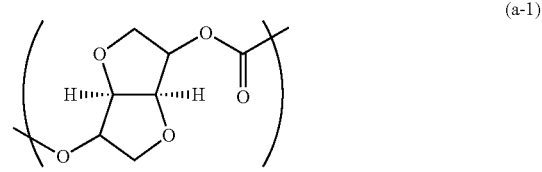

(a-1)

and a unit (a-2) represented by the following formula (a-2):

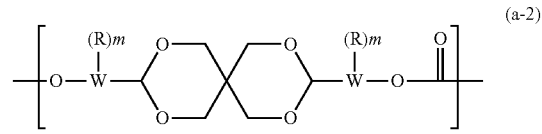

(a-2)

wherein W represents an alkylene group having 1 to 20 carbon atoms or a cycloalkylene group having 6 to 20 carbon atoms, R represents a branched or linear alkyl group having 1 to 20 carbon atoms, or a cycloalkyl group having 6 to 20 carbon atoms and optionally having a substituent, and m represents an integer of 0 to 10, and the molar ratio of the unit (a-1) and the unit (a-2) (a-1/a-2) is 40/60 to 95/5. The multilayer body has excellent transparency, chemical resistance, surface hardness, and adhesion.

8 Claims, No Drawings

(56) References Cited

U.S. PATENT DOCUMENTS

| | | | |
|---|---|---|---|
| 2014/0031493 A1* | 1/2014 | Sasaki | C08L 69/00 525/67 |
| 2017/0203556 A1* | 7/2017 | Imazato | B32B 27/365 |
| 2019/0352502 A1* | 11/2019 | Imazato | B32B 27/365 |

FOREIGN PATENT DOCUMENTS

| | | | | |
|---|---|---|---|---|
| JP | 2009-46519 | 3/2009 | | |
| JP | 2009-102536 | 5/2009 | | |
| JP | 2011-161871 | 8/2011 | | |
| JP | 2011-201304 | 10/2011 | | |
| JP | 2015-160941 | 9/2015 | | |
| JP | 2015-160942 | 9/2015 | | |
| JP | 2016-7728 | 1/2016 | | |
| WO | 2013/018459 | 2/2013 | | |
| WO | 2015/119026 | 8/2015 | | |
| WO | WO-2015119026 A1 * | 8/2015 | | B32B 27/08 |
| WO | 2016/158827 | 10/2016 | | |

OTHER PUBLICATIONS

International Search Report dated May 1, 2018 in International (PCT) Application No. PCT/JP2018/002965.

* cited by examiner

MULTILAYER BODY

TECHNICAL FIELD

The present invention relates to a multilayer body having excellent transparency, chemical resistance, surface hardness, and adhesion.

BACKGROUND ART

Conventionally, as transparent resins, a methacrylic resin, a polycarbonate resin formed from bisphenol A (hereinafter, frequently referred to as "PC-A"), and the like have been known, and they are used in the form of a formed article, a film or the like in a wide variety of fields of electric and electronic parts, optical parts, automobile parts, mechanical parts, and the like.

Methacrylate resins, such as polymethyl methacrylate (hereinafter, frequently referred to as "PMMA"), have high transparency and high surface hardness (pencil hardness: H to 3H), and are widely used as optical materials, such as lenses and optical fibers. However, the methacrylate resins have a poor resistance to chemicals used in daily life, such as a sunscreen agent, and pose a problem in that the use of them is limited in applications where human hands come directly in contact therewith. Further, acrylic resins are considered to have a problem with resistance to perfumes or sunscreen creams.

Further, recently, concern about depletion of petroleum resources and the problem of increasing levels of atmospheric carbon dioxide which could cause global warming have drawn attention to biomass resources, because their raw materials do not depend on petroleum, and the biomass resources are carbon neutral and thus do not increase carbon dioxide levels even when burnt, and, in the field of polymers, biomass plastics produced from biomass resources are being actively developed. Particularly, polycarbonates produced mainly with isosorbide as a monomer are excellent in heat resistance, weathering resistance, surface hardness, and chemical resistance, and their features different from those of PC-A have attracted attention. Various studies are being done on such polycarbonates (PTLs 1 and 2). These isosorbide polycarbonates have excellent heat resistance, impact resistance, and weathering resistance, but have poor adhesion to other resins, for example, markedly poor adhesion to PC-A or PMMA, which usually makes it difficult to form a multilayer body from the isosorbide polycarbonates.

PTL 3 has proposed a laminate of an isosorbide polycarbonate and an acrylic resin. However, the proposed laminate has very poor adhesion and thus does not have practically useful performance. Further, the laminate is expected to have a PMMA surface as the outermost surface, so that the problem of poor chemical resistance can remain unsolved.

Various types of laminates of PC-A and an isosorbide polycarbonate have been proposed (PTLs 4 and 5). However, with respect to these laminates, for surely achieving the adhesion to PC-A, there is a need to reduce the copolymerization ratio of the isosorbide, and therefore the problem of poor chemical resistance arises.

PTL 6 discloses a laminate of an acrylic resin and a copolymer composition having an isosorbide unit and a spiro ring skeleton, but has no description about the viewpoint of surely achieving the adhesion of the laminate to other various resins.

Thus, a resin having transparency, chemical resistance, surface hardness, and excellent adhesion to various types of thermoplastic resins, and a multilayer body produced with such a resin have not yet been provided.

CITATION LIST

Patent Literature

PTL 1: JP-A-2006-36954
PTL 2: JP-A-2009-46519
PTL 3: JP-A-2011-161871
PTL 4: JP-A-2011-201304
PTL 5: PCT International Publication No. WO 2015/119026
PTL 6: JP-A-2016-7728

DISCLOSURE OF INVENTION

Technical Problem

An object of the present invention is to provide a multilayer body having excellent transparency, chemical resistance, surface hardness, and adhesion.

Solution to Problem

The present inventors have conducted extensive and intensive studies. As a result, it has been found that, by using a resin composition comprising a polycarbonate resin, which contains an isosorbide and a monomer having a specific spiro ring structure as a copolymerizable monomer in a certain ratio, and an acrylic resin, the adhesion to another thermoplastic resin can be remarkably improved, and further a multilayer body having a layer including the resin composition and a layer including another thermoplastic resin has excellent transparency, chemical resistance, surface hardness, and adhesion, and the present invention has been completed.

Specifically, in the present invention, the object of the invention is achieved by the following.

1. A multilayer body including: at least one layer (C) including a resin composition; and at least one layer (D) including a thermoplastic resin, the resin composition including a polycarbonate resin (A) and an acrylic resin (B) in a weight ratio of 40:60 to 99:1, the polycarbonate resin (A) including, as main repeating units, a unit (a-1) represented by the following formula (a-1):

[Chem. 1]

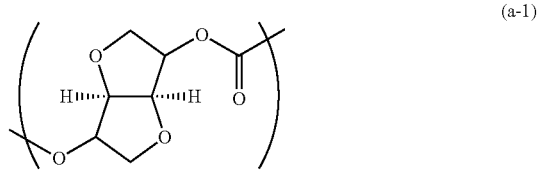

and a unit (a-2) represented by the following formula (a-2):

[Chem. 2]

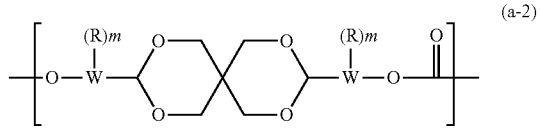

wherein W represents an alkylene group having 1 to 20 carbon atoms or a cycloalkylene group having 6 to 20 carbon atoms, R represents a branched or linear alkyl group having 1 to 20 carbon atoms, or a cycloalkyl group having 6 to 20 carbon atoms and optionally having a substituent, and m represents an integer of 0 to 10, the unit (a-1) and the unit (a-2) being in a molar ratio (a-1/a-2) of 40/60 to 95/5.

2. The multilayer body according to item 1, which has the layer (C) including the resin composition as an outermost layer and the layer (D) including the thermoplastic resin as at least one inner layer.

3. The multilayer body according to item 1 or 2, wherein the layer (C) including the resin composition has a glass transition temperature in the range of 90 to 150° C.

4. The multilayer body according to any one of items 1 to 3, wherein the acrylic resin (B) is an acrylic resin derived from methyl methacrylate and/or methyl acrylate.

5. The multilayer body according to any one of items 1 to 4 above, wherein the unit (a-2) of the polycarbonate resin (A) is a unit derived from 3,9-bis(2-hydroxy-1,1-dimethylethyl)-2,4,8,10-tetraoxaspiro(5.5) undecane.

6. The multilayer body according to any one of items 1 to 5, wherein the polycarbonate resin (A) has a specific viscosity of 0.2 to 1.5.

7. The multilayer body according to any one of items 1 to 6, wherein the layer (D) including the thermoplastic resin is a layer including an acrylic resin or a polycarbonate resin.

8. The multilayer body according to any one of items 1 to 7, wherein the total thickness of the layer or layers (C) including the resin composition is 5 to 50% of the whole thickness of the multilayer body.

9. The multilayer body according to any one of items 1 to 8, which has a whole thickness of 0.03 to 300 mm.

Advantageous Effects of Invention

In the invention, by using a resin composition comprising a polycarbonate resin, which contains an isosorbide and a monomer having a specific spiro ring structure as a copolymerizable monomer in a certain ratio, and an acrylic resin, there can be provided a multilayer body having a layer including the resin composition and a layer including another thermoplastic resin, wherein the multilayer body has excellent transparency, chemical resistance, surface hardness, and adhesion. Therefore, commercial effects obtained by the multilayer body are of great significance.

DESCRIPTION OF EMBODIMENTS

Hereinbelow, the present invention will be described in detail.

<Polycarbonate Resin (A)>

In the invention, the polycarbonate resin (A) has a unit (a-1) and a unit (a-2) as main repeating units. The term "main repeating units" means that the total amount of the unit (a-1) and the unit (a-2) is preferably 50 mol % or more, more preferably 60 mol % or more, further preferably 70 mol % or more, especially preferably 80 mol % or more, based on the total mole of all the repeating units.

(Unit (a-1))

The unit (a-1) in the invention is, as shown in the formula (a-1) above, derived from an aliphatic diol having an ether group.

Among the biomass resources represented by the formula (a-1) above, the polycarbonate resin containing a diol having an ether linkage is a material having high heat resistance and high pencil hardness.

As stereoisomers for the formula (a-1) above, there can be mentioned repeating units (a-1-1), (a-1-2), and (a-1-3) represented by the following formulae.

[Chem. 3]

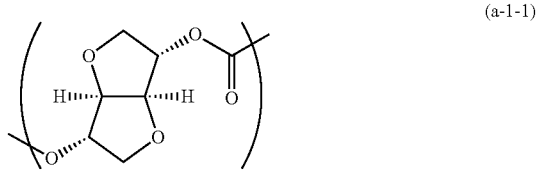

(a-1-1)

[Chem. 4]

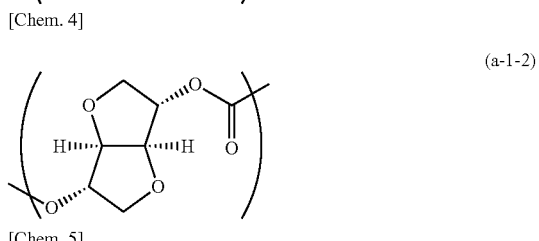

(a-1-2)

[Chem. 5]

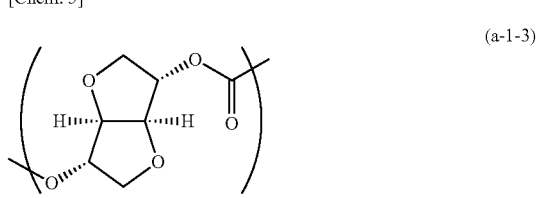

(a-1-3)

These are an ether diol derived from saccharides, which is a material obtained also from biomass in the natural world, and which is one of the materials called renewable resources. The repeating units (a-1-1), (a-1-2), and (a-1-3) are called isosorbide, isomannide, and isoidide, respectively, and are units derived from an aliphatic diol. The isosorbide is obtained by hydrogenating D-glucose obtained form starch, and then subjecting the resultant material to dehydration. The other ether diols are obtained by the similar reaction, except for the starting materials.

Among the isosorbide, isomannide, and isoidide, especially, repeating units derived from isosorbide (1,4;3,6-dianhydro-D-sorbitol) are preferred in view of ease of the production and excellent heat resistance.

(Unit (a-2))

The unit (a-2) in the invention is, as shown in the formula (a-2) above, derived from a diol having a spiro ring structure.

In the formula (a-2), W is preferably an alkylene group having 1 to 10 carbon atoms or a cycloalkylene group having 6 to 10 carbon atoms, more preferably an alkylene group having 1 to 4 carbon atoms.

R is preferably a branched or linear alkyl group having 1 to 10 carbon atoms, or a cycloalkyl group having 6 to 10 carbon atoms and optionally having a substituent, more preferably a branched or linear alkyl group having 1 to 4 carbon atoms. The substituent is preferably a branched or linear alkyl group having 1 to 4 carbon atoms.

m is preferably an integer of 0 to 5, preferably an integer of 1 to 4.

Specific examples of diol compounds having a spiro ring structure include alicyclic diol compounds, such as 3,9-bis (2-hydroxyethyl)-2,4,8,10-tetraoxaspiro(5.5)undecane, 3,9-bis(2-hydroxy-1,1-dimethylethyl)-2,4,8,10-tetraoxaspiro (5.5)undecane, 3,9-bis(2-hydroxy-1,1-diethylethyl)-2,4,8, 10-tetraoxaspiro (5.5)undecane, and 3,9-bis(2-hydroxy-1,1-dipropylethyl)-2,4,8,10-tetraoxaspiro(5.5)undecane.

3,9-Bis(2-hydroxy-1,1-dimethylethyl)-2,4,8,10-tetraoxaspiro(5.5)undecane is preferably used.

(Other Units)

With respect to the diol compound from which other units other than the unit (a-1) and unit (a-2) are derived, any of the other aliphatic diol compounds, alicyclic diol compounds, and aromatic dihydroxy compounds may be used, and examples of such compounds include diol compounds described in International Patent Application Publication No. 2004/111106 pamphlet and International Patent Application Publication No. 2011/021720 pamphlet, and oxyalkylene glycols, such as diethylene glycol, triethylene glycol, tetraethylene glycol, and polyethylene glycol.

Examples of aliphatic diol compounds include 1,3-propanediol, 1,4-butanediol, 1,5-pentanediol, 1,6-hexanediol, 1,8-octanediol, 1,9-nonanediol, 1,10-decanediol, 1,12-dodecanediol, 2-methyl-1,3-propanediol, neopentyl glycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexane glycol, 1,2-octyl glycol, 2-ethyl-1,3-hexanediol, 2,3-diisobutyl-1,3-propanediol, 2,2-diisoamyl-1,3-propanediol, and 2-methyl-2-propyl-1,3-propanediol.

Examples of alicyclic diol compounds include cyclohexanedimethanol, tricyclodecanedimethanol, adamantanediol, pentacyclopentadecanedimethanol, and 2,2,4,4-tetramethyl-1,3-cyclobutanediol.

Examples of aromatic dihydroxy compounds include α,α'-bis(4-hydroxyphenyl)-m-diisopropylbenzene (bisphenol M), 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenyl sulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF), and 1,1-bis(4-hydroxyphenyl)decane.

(Formulation)

The polycarbonate resin (A) used in the invention has main repeating units comprising a unit (a-1) and a unit (a-2), wherein the molar ratio of these units (a-1/a-2) is 40/60 to 95/5. When the molar ratio (a-1/a-2) is 40/60 to 95/5, not only high chemical resistance and high surface hardness but also compatibility with an acrylic resin can be advantageously obtained. The molar ratio of the unit (a-1) and the unit (a-2) (a-1/a-2) is preferably 50/50 to 93/7, further preferably 60/40 to 90/10. When having the formulation in the above range, particularly, excellent balance between the compatibility of the polycarbonate resin with an acrylic resin and the chemical resistance can be obtained. When the molar ratio (a-1/a-2) is smaller than 40/60, the chemical resistance is poor. On the other hand, when the molar ratio (a-1/a-2) is larger than 95/5, the compatibility of the polycarbonate resin with an acrylic resin is likely to become poor. The molar ratio (a-1/a-2) can be determined by making measurement using JNM-AL400 proton NMR, manufactured by JEOL LTD.

(Method for Producing the Polycarbonate Resin (A))

The polycarbonate resin (A) is produced by a known reaction method used for producing a general polycarbonate resin, for example, a method in which a carbonate precursor, such as a carbonic diester, is reacted with a diol component. With respect to the method for producing the polycarbonate resin, a basic method is briefly described below.

A transesterification reaction using a carbonic diester as a carbonate precursor is conducted by a method in which a diol component and a carbonic diester in a predetermined proportion are stirred in an inert gas atmosphere while heating so as to distil off the formed alcohol or phenol. The reaction temperature varies depending on the boiling point of the formed alcohol or phenol and the like, but is generally in the range of 120 to 300° C. From the initial stage of the reaction, the reaction is conducted under a reduced pressure while distilling off the formed alcohol or phenol so that the reaction is completed. Further, if necessary, a terminator, an antioxidant, or the like may be added.

Examples of carbonic diesters used in the transesterification reaction include optionally substituted C6 to C12 aryl or aralkyl esters. Specific examples include diphenyl carbonate, ditolyl carbonate, bis(chlorophenyl) carbonate, and m-cresyl carbonate. Of these, diphenyl carbonate is especially preferred. The amount of the diphenyl carbonate used is preferably 0.97 to 1.10 mol, more preferably 1.00 to 1.06 mol, relative to 1 mol of the total of the dihydroxy compounds.

Further, in a melt polymerization method, for increasing the polymerization rate, a polymerization catalyst can be used, and examples of such polymerization catalysts include alkali metal compounds, alkaline earth metal compounds, nitrogen-containing compounds, and metal compounds.

With respect to the above compound, an organic acid salt, an inorganic acid salt, an oxide, a hydroxide, a hydride, an alkoxide, or a quaternary ammonium hydroxide of an alkali metal or an alkaline earth metal, or the like is preferably used, and these compounds can be used individually or in combination.

Examples of alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt, a dipotassium salt, a dicesium salt, and a dilithium salt of bisphenol A, and a sodium salt, a potassium salt, a cesium salt, and a lithium salt of phenol.

Examples of alkaline earth metal compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, barium diacetate, and barium stearate.

Examples of nitrogen-containing compounds include quaternary ammonium hydroxides having an alkyl or aryl group or the like, such as tetramethylammonium hydroxide, tetraethylammonium hydroxide, tetrapropylammonium hydroxide, tetrabutylammonium hydroxide, and trimethylbenzylammonium hydroxide. Further, examples include tertiary amines, such as triethylamine, dimethylbenzylamine, and triphenylamine, and imidazoles, such as 2-methylimidazole, 2-phenylimidazole, and benzimidazole. Further, examples include bases or basic salts, such as ammonia, tetramethylammonium borohydride, tetrabutylammonium borohydride, tetrabutylammonium tetraphenylborate, and tetraphenylammonium tetraphenylborate.

Examples of metal compounds include a zinc aluminum compound, a germanium compound, an organotin compound, an antimony compound, a manganese compound, a titanium compound, and a zirconium compound. These compounds may be used individually or in combination.

The amount of the polymerization catalyst used is preferably selected in the range of $1\times10^{-9}$ to $1\times10^{-2}$ equivalent, preferably $1\times10^{-8}$ to $1\times10^{-5}$ equivalent, more preferably $1\times10^{-7}$ to $1\times10^{-3}$ equivalent, relative to 1 mol of the diol component.

Further, a catalyst deactivator can be added in the late stage of the reaction. With respect to the catalyst deactivator to be used, a known catalyst deactivator is effectively used, but, especially, ammonium salts and phosphonium salts of sulfonic acid are preferred. Further, salts of dodecylbenzenesulfonic acid, such as tetrabutylphosphonium dodecylbenzenesulfonate, and salts of paratoluenesulfonic acid, such as tetrabutylammonium paratoluenesulfonate, are preferred.

Further, as a sulfonic ester, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate, phenyl paratoluenesulfonate, or the like is preferably used. Especially, tetrabutylphosphonium dodecylbenzenesulfonate is most preferably used.

With respect to the amount of the catalyst deactivator used, when at least one polymerization catalyst selected from an alkali metal compound and/or an alkaline earth metal compound is used, the catalyst deactivator can be used preferably in an amount of 0.5 to 50 mol, more preferably 0.5 to 10 mol, further preferably 0.8 to 5 mol, relative to 1 mol of the catalyst.

(Specific viscosity: $\eta_{SP}$)

The polycarbonate resin (A) preferably has a specific viscosity ($\eta_{SP}$) in the range of 0.2 to 1.5. When the specific viscosity of the polycarbonate resin (A) is in the range of 0.2 to 1.5, a formed article, such as a film, having excellent strength and formability can be obtained. The specific viscosity is more preferably 0.25 to 1.2, further preferably 0.3 to 1.0, especially preferably 0.3 to 0.5.

The specific viscosity in the invention is determined using an Ostwald viscometer with respect to a solution obtained by dissolving 0.7 g of a polycarbonate resin in 100 ml of methylene chloride at 20° C.

Specific viscosity $(\mu_{SP}) = (t - t_0)/t_0$

[$t_0$ is a drop time (seconds) of methylene chloride, and t is a drop time (seconds) of a sample solution]

Specific measurement of a specific viscosity can be conducted, for example, in accordance with the following procedure. A polycarbonate resin is first dissolved in methylene chloride having a weight 20 to 30 times that of the resin, and the soluble material is taken by Celite filtration, and then the solution is removed and the resultant material is well dried to obtain a methylene chloride-soluble material in the form of a solid. 0.7 g of the obtained solid is dissolved in 100 ml of methylene chloride, and, with respect to the resultant solution, a specific viscosity at 20° C. is determined using an Ostwald viscometer.

<Acrylic Resin (B)>

With respect to the acrylic resin used in the invention, an acrylic resin which is a thermoplastic resin is used. As examples of monomers used in the acrylic resin, there can be mentioned the following compounds. Examples include methyl methacrylate, methacrylic acid, acrylic acid, benzyl (meth)acrylate, n-butyl (meth)acrylate, i-butyl (meth)acrylate, t-butyl (meth)acrylate, 2-ethylhexyl (meth)acrylate, lauryl (meth)acrylate, tridecyl (meth)acrylate, stearyl (meth) acrylate, glycidyl (meth)acrylate, hydroxypropyl (meth) acrylate, 2-methoxyethyl (meth)acrylate, 2-ethoxyethyl (meth)acrylate, cyclohexyl (meth)acrylate, isobornyl (meth) acrylate, norbornyl (meth)acrylate, dicyclopentenyl (meth) acrylate, dicyclopentanyl (meth)acrylate, dicyclopentenyloxyethyl (meth)acrylate, tetrahydrofurfuryl (meth)acrylate, acryl (meth)acrylate, 2-hydroxyethyl (meth)acrylate, 2-(meth)acryloyloxyethyl succinate, 2-(meth)acryloyloxyethyl maleate, 2-(meth)acryloyloxyethyl phthalate, 2-(meth) acryloyloxyethyl hexahydrophthalate, pentamethylpiperidyl (meth)acrylate, tetramethylpiperidyl (meth)acrylate, dimethylaminoethyl (meth)acrylate, diethylaminoethyl (meth) acrylate, cyclopentyl methacrylate, cyclopentyl acrylate, cyclohexyl methacrylate, cyclohexyl acrylate, cycloheptyl methacrylate, cycloheptyl acrylate, cyclooctyl methacrylate, cyclooctyl acrylate, cyclododecyl methacrylate, and cyclododecyl acrylate.

These may be used in a way such that they are individually homopolymerized or two or more of them are polymerized. Particularly, the acrylic resin preferably contains methyl methacrylate and/or methyl acrylate. The acrylic resin preferably contains, as monomer components, 50 to 99 mol % of methyl methacrylate and 1 to 50 mol % of methyl acrylate, more preferably 60 to 99 mol % of methyl methacrylate and 1 to 40 mol % of methyl acrylate, further preferably 70 to 99 mol % of methyl methacrylate and 1 to 30 mol % of methyl acrylate. When the amount of methyl methacrylate as a monomer component is more than 99 mol %, the resistance to thermal decomposition is likely to become poor, causing a forming defect, such as silver blister, upon forming. When the amount of methyl methacrylate as a monomer component is less than 50 mol %, the thermal deformation temperature is likely to be lowered. Further, another monomer polymerizable with these acrylic monomers, for example, a polyolefin monomer, a vinyl monomer, or the like may be used in an amount of 0 to 30% by weight.

With respect to the molecular weight of the acrylic resin, there is no particular limitation, but, when the acrylic resin has a weight average molecular weight in the range of 30,000 to 300,000, a film being formed from the resultant resin composition does not suffer formation of poor appearance, such as flow unevenness, making it possible to provide a film having excellent mechanical properties and heat resistance.

Further, the acrylic resin used in the invention preferably has a glass transition temperature (Tg) of 90 to 150° C., more preferably 95 to 145° C., further preferably 100 to 140° C. When the Tg of the acrylic resin is 90 to 150° C., excellent heat stability and formability are advantageously obtained.

The glass transition temperature (Tg) is measured at a temperature elevation rate of 20° C./min using DSC Model 2910, manufactured by TA Instruments Japan Co., Ltd.

With respect to the acrylic resin in the invention, there is no particular limitation, but preferred is an acrylic resin having a melt flow rate of 0.5 to 30 g/10 min, as measured at 230° C. under a load of 3.8 kg in accordance with JIS K7210. More preferred is an acrylic resin having a melt flow rate of 0.7 to 27 g/10 min, and further preferred is an acrylic resin having a melt flow rate of 1.0 to 25 g/10 min. The acrylic resin having a melt flow rate in the above range has excellent formability.

Further, in the acrylic resin, a general additive, such as a heat stabilizer, an ultraviolet light absorber, a light stabilizer, a colorant, a release agent, a lubricant, an antistatic agent, or a matting agent, may be added.

<Resin Composition (C)>

(Method for Producing the Resin Composition)

In the resin composition in the invention, the polycarbonate resin (A) and the acrylic resin (B) are preferably blended in a molten state. As a method of blending the resins in a molten state, an extruder is generally used, and the resins are kneaded preferably at a molten resin temperature of 200 to 320° C., more preferably 220 to 300° C., further preferably 230 to 290° C., and then pelletized. By this method, pellets of the resin composition having the both resins uniformly blended are obtained. With respect to the construction of the extruder, the construction of the screw, and the like, there is no particular limitation. When the molten resin temperature in the extruder is higher than 320° C., the resin is likely to suffer discoloration or thermal decomposition. On the other hand, when the resin temperature is lower than 200° C., the resin viscosity is likely to become too high, causing an excess load on the extruder.

(Weight Ratio)

The polycarbonate resin and the acrylic resin can be mixed arbitrarily in a weight ratio in the range of 40:60 to 99:1, preferably in the range of 45:55 to 98:2 (weight ratio), more preferably in the range of 50:50 to 97:3 (weight ratio), further preferably in the range of 60:40 to 95:5 (weight ratio). When the polycarbonate component ratio is less than 40% by weight, a problem about the chemical resistance arises. When the weight ratio is in the above range, a resin composition having excellent heat resistance, chemical resistance, surface hardness, and adhesion to another thermoplastic resin can be obtained.

(Glass Transition Temperature: Tg)

The resin composition in the invention has a single glass transition temperature (Tg), and the glass transition temperature (Tg) is preferably 90 to 150° C., more preferably 100 to 140° C., further preferably 110 to 130° C. When the Tg of the resin composition is in the above range, excellent heat stability and formability are advantageously obtained.

The glass transition temperature (Tg) is measured at a temperature elevation rate of 20° C./min using DSC Model 2910, manufactured by TA Instruments Japan Co., Ltd. In the invention, the single glass transition temperature (Tg) indicates that when a glass transition temperature is measured at a heating rate of 20° C./minute using a differential scanning calorimeter (DSC) in accordance with JIS K7121, only a single point of inflection representing a glass transition temperature appears.

Generally, a polymer blended composition having a single glass transition temperature means the composition in a state such that the blended resins are compatible on the order of nanometer (molecular level), and can be regarded as a system in which the resins are soluble in each other.

(Pencil Hardness)

The resin composition in the invention preferably has a pencil hardness of F or higher. In view of excellent scratch resistance, the resin composition more preferably has a pencil hardness of H or higher. The resin composition having a pencil hardness of 4H or lower has a satisfactory function. The pencil hardness of the resin composition can be enhanced by increasing the weight ratio for the acrylic resin. In the invention, the pencil hardness indicates a hardness such that the resin in the invention has no scratch mark after scratching the resin using a pencil having a specific pencil hardness, and a pencil hardness used in a surface hardness test for a film, which can be measured in accordance with JIS K-5600, is preferably used as an index. The pencil hardness becomes lower (softer) in the order of 9H, 8H, 7H, 6H, 5H, 4H, 3H, 2H, H, F, HB, B, 2B, 3B, 4B, 5B, and 6B wherein 9H is the highest (hardest) and 6B is the lowest (softest).

(Additive)

In the resin composition used in the invention, according to the use, or if necessary, an additive, such as a heat stabilizer, a plasticizer, a light stabilizer, a polymerization metal deactivator, a flame retardant, a lubricant, an antistatic agent, a surfactant, an anti-fungus agent, an ultraviolet light absorber, a release agent, a colorant, or an impact modifier, can be incorporated.

(Heat Stabilizer)

The resin composition used in the invention preferably contains a heat stabilizer particularly for suppressing a lowering of the molecular weight or deterioration of the color during the extrusion or forming. Examples of heat stabilizers include phosphorus heat stabilizers, phenol heat stabilizers, and sulfur heat stabilizers, and these can be used individually or in combination. Particularly, the ether diol residue of the unit (a-1) easily deteriorates due to heat and oxygen to cause discoloration, and therefore, as a heat stabilizer, a phosphorus heat stabilizer is preferably contained. As a phosphorus stabilizer, a phosphite compound is preferably incorporated. Examples of phosphite compounds include pentaerythritol phosphite compounds, phosphite compounds being capable of reacting with a dihydric phenol and having a cyclic structure, and phosphite compounds having other structures.

Specific examples of the above-mentioned pentaerythritol phosphite compounds include distearyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,6-di-tert-butyl-4-ethylphenyl) pentaerythritol diphosphite, phenylbisphenol A pentaerythritol diphosphite, bis(nonylphenyl) pentaerythritol diphosphite, and dicyclohexyl pentaerythritol diphosphite, and, of these, preferred examples include distearyl pentaerythritol diphosphite and bis(2,4-di-tert-butylphenyl) pentaerythritol diphosphite.

Examples of the above-mentioned phosphite compounds being capable of reacting with a dihydric phenol and having a cyclic structure include 2,2'-methylenebis(4,6-di-tert-butylphenyl)(2,4-di-tert-butylphenyl) phosphite, 2,2'-methylenebis(4,6-di-tert-butylphenyl)(2-tert-butyl-4-methylphenyl) phosphite, 2,2'-methylenebis(4-methyl-6-tert-butylphenyl)(2-tert-butyl-4-methylphenyl) phosphite, 2,2'-ethylidenebis(4-methyl-6-tert-butylphenyl)(2-tert-butyl-4-methylphenyl) phosphite, 2,2'-methylene-bis-(4,6-di-t-butylphenyl)octyl phosphite, and 6-tert-butyl-4-[3-[(2,4,8,10)-tetra-tert-butyldibenzo[d,f][1,3,2]dioxaphosphepin-6-yl]oxy]propyl]-2-methylphenol.

Examples of the above-mentioned phosphite compounds having other structures include triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, 2,2-methylenebis(4,6-di-tert-butylphenyl)octyl phosphite, tris(diethylphenyl) phosphite, tris(di-iso-propylphenyl) phosphite, tris(di-n-butylphenyl) phosphite, tris(2,4-di-tert-butylphenyl) phosphite, and tris(2,6-di-tert-butylphenyl) phosphite.

Examples of compounds other than the various phosphite compounds include phosphate compounds, phosphonite compounds, and phosphonate compounds.

Examples of phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate, and diisopropyl phosphate, and preferred are triphenyl phosphate and trimethyl phosphate.

Examples of phosphonite compounds include tetrakis(2,4-di-tert-butylphenyl)-4,4'-biphenylenediphosphonite, tetrakis(2,4-di-tert-butylphenyl)-4,3'-biphenylenediphosphonite, tetrakis(2,4-di-tert-butylphenyl)-3,3'-biphenylenediphosphonite, tetrakis(2,6-di-tert-butylphenyl)-4,4'-biphenylenediphosphonite, tetrakis(2,6-di-tert-butylphenyl)-4,3'-biphenylenediphosphonite, tetrakis(2,6-di-tert-butylphenyl)-3,3'-biphenylenediphosphonite, bis(2,4-di-tert-butylphenyl)-4-phenyl-phenylphosphonite, bis(2,4-di-tert-butylphenyl)-3-phenyl-phenylphosphonite, bis(2,6-di-n-butylphenyl)-3-phenyl-phenylphosphonite, bis(2,6-di-tert-butylphenyl)-4-phenyl-phenylphosphonite, and bis(2,6-di-tert-butylphenyl)-3-phenyl-phenylphosphonite, and preferred are tetrakis(di-tert-butylphenyl)-biphenylenediphosphonite and bis(di-tert-butylphenyl)-phenyl-phenylphosphonite, and more preferred are tetrakis(2,4-di-tert-butylphenyl)-biphenylenediphosphonite and bis(2,4-di-tert-butylphenyl)-phenyl-phenylphosphonite. The phosphonite compound can be preferably used in combination with the above-mentioned phosphite compound having an aryl group substituted with two or more alkyl groups.

Examples of phosphonate compounds include dimethyl benzenephosphonate, diethyl benzenephosphonate, and dipropyl benzenephosphonate.

Among the above-mentioned phosphorus heat stabilizers, trisnonylphenyl phosphite, trimethyl phosphate, tris(2,4-di-tert-butylphenyl) phosphite, bis(2,4-di-tert-butylphenyl) pentaerythritol diphosphite, or bis(2,6-di-tert-butyl-4-methylphenyl)pentaerythritol diphosphite is preferably used.

The above-mentioned phosphorus heat stabilizers can be used individually or in combination. The phosphorus heat stabilizer is preferably incorporated in an amount of 0.001 to 1 part by weight, more preferably 0.01 to 0.5 parts by weight, further preferably 0.01 to 0.3 parts by weight, relative to 100 parts by weight of the resin composition.

In the resin composition used in the invention, for the purpose of suppressing a lowering of the molecular weight or deterioration of the color during the extrusion or forming, as a heat stabilizer, a hindered phenol heat stabilizer or a sulfur heat stabilizer can be added in combination with a phosphorus heat stabilizer.

With respect to the hindered phenol heat stabilizer, there is no particular limitation as long as it has, for example, an antioxidant function, but examples of hindered phenol heat stabilizers include n-octadecyl-3-(4'-hydroxy-3',5'-di-t-butylphenyl) propionate, tetrakis{methylene-3-(3',5'-di-t-butyl-4-hydroxyphenyl) propionate}methane, distearyl(4-hydroxy-3-methyl-5-t-butylbenzyl) malonate, triethylene glycol-bis{3-(3-t-butyl-5-methyl-4-hydroxyphenyl) propionate}, 1,6-hexanediol-bis{3-(3,5-di-t-butyl-4-hydroxyphenyl) propionate}, pentaerythrityl-tetrakis{3-(3,5-di-t-butyl-4-hydroxyphenyl) propionate}, 2,2-thiodiethylenebis{3-(3,5-di-t-butyl-4-hydroxyphenyl) propionate}, 2,2-thiobis(4-methyl-6-t-butylphenol), 1,3,5-trimethyl-2,4,6-tris(3,5-di-t-butyl-4-hydroxybenzyl) benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl) propionate, 2,5,7,8-tetramethyl-2(4',8',12'-trimethyltridecyl) chroman-6-ol, and 3,3',3'',5,5',5''-hexa-t-butyl-a,a',a''-(mesitylene-2,4,6-triyl)tri-p-cresol.

Of these, n-octadecyl-3-(4'-hydroxy-3',5'-di-t-butylphenyl) propionate, pentaerythrityl-tetrakis{3-(3,5-di-t-butyl-4-hydroxyphenyl) propionate), 3,3',3'',5,5',5''-hexa-t-butyl-a,a',a'-(mesitylene-2,4,6-triyl)tri-p-cresol, 2,2-thiodiethylenebis{3-(3,5-di-t-butyl-4-hydroxyphenyl) propionate) and the like are preferred.

These hindered phenol heat stabilizers may be used individually or in combination.

The hindered phenol heat stabilizer is preferably incorporated in an amount of 0.001 to 1 part by weight, more preferably 0.01 to 0.5 parts by weight, further preferably 0.01 to 0.3 parts by weight, relative to 100 parts by weight of the resin composition.

Examples of sulfur heat stabilizers include dilauryl 3,3'-thiodipropionate, ditridecyl 3,3'-thiodipropionate, dimyristyl 3,3'-thiodipropionate, distearyl 3,3'-thiodipropionate, laurylstearyl 3,3'-thiodipropionate, pentaerythritol tetrakis (3-laurylthiopropionate), bis[2-methyl-4-(3-laurylthiopionyloxy)-5-tert-butylphenyl] sulfide, octadecyl disulfide, mercaptobenzimidazole, 2-mercapto-6-methylbenzimidazole, and 1,1'-thiobis(2-naphthol). Of these, pentaerythritol tetrakis(3-laurylthiopropionate) is preferred.

These sulfur heat stabilizers may be used individually or in combination.

The sulfur heat stabilizer is preferably incorporated in an amount of 0.001 to 1 part by weight, more preferably 0.01 to 0.5 parts by weight, further preferably 0.01 to 0.3 parts by weight, relative to 100 parts by weight of the resin composition.

When the phosphite heat stabilizer, phenol heat stabilizer, and sulfur heat stabilizer are used in combination, the total amount of these heat stabilizers incorporated is preferably 0.001 to 1 part by weight, more preferably 0.01 to 0.3 parts by weight, relative to 100 parts by weight of the resin composition.

(Release Agent)

In the resin composition used in the invention, for further improving the release properties from a mold upon melt molding, a release agent can be incorporated in such an amount that the effects aimed at by the invention are not sacrificed.

Examples of such release agents include higher fatty acid esters of a monohydric or polyhydric alcohol, higher fatty acids, a paraffin wax, beeswax, an olefin wax, an olefin wax containing a carboxyl group and/or a carboxylic anhydride group, a silicone oil, and organopolysiloxane.

As a higher fatty acid ester, preferred is a partial ester or a complete ester of a monohydric or polyhydric alcohol having 1 to 20 carbon atoms and a saturated fatty acid having 10 to 30 carbon atoms. Examples of the partial esters or complete esters of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate.

Of these, monoglyceride stearate, triglyceride stearate, pentaerythritol tetrastearate, or behenyl behenate is preferably used.

As a higher fatty acid, a saturated fatty acid having 10 to 30 carbon atoms is preferred. Examples of such fatty acids include myristic acid, lauric acid, palmitic acid, stearic acid, and behenic acid.

These release agents may be used individually or in combination. The amount of the release agent incorporated is preferably 0.01 to 5 parts by weight, relative to 100 parts by weight of the resin composition.

(Ultraviolet Light Absorber)

The resin composition used in the invention can contain an ultraviolet light absorber. Examples of ultraviolet light absorbers include a benzotriazole ultraviolet light absorber, a benzophenone ultraviolet light absorber, a triazine ultraviolet light absorber, a cyclic imino ester ultraviolet light absorber, and a cyanoacrylate ultraviolet light absorber, and, of these, a benzotriazole ultraviolet light absorber is preferred.

Examples of benzotriazole ultraviolet light absorbers include benzotriazole ultraviolet light absorbers, such as 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-[2'-hydroxy-3'-(3",4",5",6"-tetraphthalimidomethyl)-5'-m ethylphenyl] benzotriazole, 2-(2'-hydroxy-3'-tert-butyl-5'-methylphenyl)-5-chlorobenzo triazole, 2-(2'-hydroxy-3',5'-di-tert-butylphenyl)-5-chlorobenzotriazole, 2,2'-methylenebis[4-(1,1,3,3-tetramethylbutyl)-6-(2H-benzo triazol-2-yl) phenol], and a condensation product of methyl-3-[3-tert-butyl-5-(2H-benzotriazol-2-yl)-4-hydroxyphenyl propionate-polyethylene glycol.

The amount of the ultraviolet light absorber incorporated is preferably 0.03 to 2.5 parts by weight, more preferably 0.1 to 2 parts by weight, further preferably 0.2 to 1.5 parts by weight, relative to 100 parts by weight of the resin composition.

(Light Stabilizer)

The resin composition used in the invention can contain a light stabilizer. When containing a light stabilizer, the resin composition has excellent weathering resistance and has an advantage in that a formed article produced from the resin composition is unlikely to suffer formation of a crack.

Examples of light stabilizers include hindered amines, such as 1,2,2,6,6-pentamethyl-4-piperidyl methacrylate, bis (2,2,6,6-tetramethyl-1-octyloxy-4-piperidinyl) didecanoate, bis(1,2,2,6,6-pentamethyl-4-piperidinyl)-[[3,5-bis(1,1-dimethylethyl)-4-hydroxyphenyl]methyl]butyl malonate, 2,4-bis[N-butyl-N-(1-cyclohexyloxy-2,2,6,6-tetramethylpiperidin-2-yl)amino]-6-(2-hydroxyethylamine)-1,3,5-triazine, bis(1,2,2,6,6-pentamethyl-4-piperidinyl) sebacate, methyl (1,2,2,6,6-pentamethyl-4-piperidinyl) sebacate, bis(2,2,6,6-tetramethyl-4-piperidyl) carbonate, bis(2,2,6,6-tetramethyl-4-piperidyl) succinate, bis(2,2,6,6-tetramethyl-4-piperidyl) sebacate, 4-benzoyloxy-2,2,6,6-tetramethylpiperidine, 4-octanoyloxy-2,2,6,6-tetramethylpiperidine, bis(2,2,6,6-tetramethyl-4-piperidyl) diphenylmethane-p,p'-dicarbamate, bis(2,2,6,6-tetramethyl-4-piperidyl) benzene-1,3-disulfonate, and bis(2,2,6,6-tetramethyl-4-piperidyl)phenyl phosphite; and nickel complexes, such as nickel bis(octylphenyl sulfide, nickel complex-3,5-di-t-butyl-4-hydroxybenzyl phosphate monoethylate, and nickel dibutyldithiocarbamate. These light stabilizers may be used individually or in combination. The amount of the light stabilizer contained is preferably 0.001 to 1 part by weight, more preferably 0.01 to 0.5 parts by weight, relative to 100 parts by weight of the resin composition.

(Epoxy Stabilizer)

In the resin composition used in the invention, for improving the hydrolyzability, an epoxy compound can be incorporated in such an amount that the effects aimed at by the invention are not sacrificed.

Examples of epoxy stabilizers include epoxidized soybean oil, epoxidized linseed oil, phenyl glycidyl ether, allyl glycidyl ether, t-butyl phenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl phthalate, diglycidyl hexahydrophthalate, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate, and di-n-butyl-3-t-butyl-4,5-epoxy-cis-1,2-cyclohexyl dicarboxylate. Bisphenol A diglycidyl ether is preferred in view of the compatibility and the like.

The epoxy stabilizer is incorporated in an amount preferably in the range of 0.0001 to 5 parts by weight, more preferably 0.001 to 1 part by weight, further preferably 0.005 to 0.5 parts by weight, relative to 100 parts by weight of the resin composition.

(Bluing Agent)

In the resin composition used in the invention, a bluing agent can be incorporated for neutralizing the yellow color of a lens due to a polymer or an ultraviolet light absorber. As a bluing agent, any bluing agent can be used without any particular problem as long as it is for use in polycarbonate. Generally, an anthraquinone dye is easily available and preferred.

Specific representative examples of bluing agents include general name: Solvent Violet 13 [CA. No (color index No) 60725], general name: Solvent Violet 31 [CA. No 68210, general name: Solvent Violet 33 [CA. No 60725], general name: Solvent Blue 94 [CA. No 61500], general name: Solvent Violet 36 [CA. No 68210], general name: Solvent Blue 97 ["Macrolex Violet RR", manufactured by Bayer AG], and general name: Solvent Blue 45 [CA. No 61110].

These bluing agents may be used individually or in combination. The bluing agent is preferably incorporated in an amount of $0.1 \times 10^{-4}$ to $2 \times 10^{-4}$ parts by weight, relative to 100 parts by weight of the resin composition.

(Flame Retardant)

In the resin composition used in the invention, a flame retardant can be incorporated. Examples of flame retardants include halogen flame retardants, such as a brominated epoxy resin, brominated polystyrene, brominated polycarbonate, brominated polyacrylate, and chlorinated polyethylene; phosphate flame retardants, such as a monophosphate compound and a phosphate oligomer compound; organophosphorus flame retardants other than the phosphate flame retardant, such as a phosphinate compound, a phosphonate compound, a phosphonitrile oligomer compound, and a phosphonic acid amide compound; organometal salt flame retardants, such as an organic sulfonic acid alkaline (earth) metal salt, a metal borate flame retardant, and a metal stannate flame retardant; and a silicone flame retardant, an ammonium polyphosphate flame retardant, and a triazine flame retardant. Further, separately, a flame retardant auxiliary (e.g., sodium antimonate or antimony trioxide), an anti-dropping agent (e.g., polytetrafluoroethylene having a fibril forming ability), or the like may be incorporated and used in combination with a flame retardant.

Among the above-mentioned flame retardants, the compounds containing neither a chlorine atom nor a bromine atom are believed to reduce unfavorable factors when conducting the thermal disposal or thermal recycle, and therefore are more preferred as a flame retardant used in the formed article in the invention having a feature such that a load on the environment is reduced.

When a flame retardant is incorporated, the amount of the flame retardant is preferably in the range of 0.05 to 50 parts by weight, relative to 100 parts by weight of the resin composition. When the amount of the flame retardant is 0.05 parts by weight or more, satisfactory flame retardancy is exhibited, and, when the amount of the flame retardant is 50 parts by weight or less, a formed article produced from the resultant resin composition has excellent strength and heat resistance.

(Elastomeric Polymer)

In the resin composition used in the invention, as an impact modifier, an elastomeric polymer can be used, and examples of elastomeric polymers include graft copolymers obtained by copolymerizing a natural rubber or a rubber component having a glass transition temperature of 10° C. or lower with one or more monomers selected from an aromatic vinyl, a vinyl cyanide, an acrylate, a methacrylate, and a vinyl compound copolymerizable with these monomers. More preferred elastomeric polymers include core-shell type graft copolymers in which a shell of the above one or more monomers is graft-copolymerized on a core of a rubber component.

Further, examples include block copolymers of the rubber component and the above-mentioned monomer. Specific examples of such block copolymers include thermoplastic elastomers, such as a styrene-ethylene propylene-styrene elastomer (hydrogenated styrene-isoprene-styrene elastomer), and a hydrogenated styrene-butadiene-styrene elastomer. Further, various elastomeric polymers known as other thermoplastic elastomers, for example, a polyurethane elastomer, a polyester elastomer, a polyether amide elastomer, and the like can be used.

A more preferred impact modifier is a core-shell type graft copolymer. In the core-shell type graft copolymer, the particle diameter of the core, in terms of a weight average particle diameter, is preferably 0.05 to 0.8 μm, more preferably 0.1 to 0.6 μm, further preferably 0.1 to 0.5 μm. When the particle diameter of the core is in the range of 0.05 to 0.8 μm, more excellent impact resistance is achieved. The elastomeric polymer preferably contains a rubber component in an amount of 40% or more, further preferably 60% or more.

Examples of the rubber components include a butadiene rubber, a butadiene-acryl composite rubber, an acrylic rubber, an acryl-silicone composite rubber, an isobutylene-silicone composite rubber, an isoprene rubber, a styrene-butadiene rubber, a chloroprene rubber, an ethylene-propylene rubber, a nitrile rubber, an ethylene-acryl rubber, a silicone rubber, an epichlorohydrin rubber, a fluororubber, and materials obtained by hydrogenating these rubbers at their unsaturated bond portions, but, from the viewpoint of removing concern about the generation of a harmful substance upon burning, a rubber component containing no halogen atom is preferred in respect of a load on the environment.

The rubber component preferably has a glass transition temperature of −10° C. or lower, more preferably −30° C. or lower, and, with respect to the rubber component, especially preferred are a butadiene rubber, a butadiene-acryl composite rubber, an acrylic rubber, and an acryl-silicone composite rubber. The composite rubber means a rubber produced by copolymerizing two rubber components, or polymerizing two rubber components to form an IPN structure in which the rubber components are entangled with each other so as not to be separated from one another.

With respect to the vinyl compound copolymerizable with the rubber component, examples of aromatic vinyls include styrene, α-methylstyrene, p-methylstyrene, an alkoxystyrene, and halogenated styrene, and especially preferred is styrene. Further, examples of acrylates include methyl acrylate, ethyl acrylate, butyl acrylate, cyclohexyl acrylate, and octyl acrylate, and examples of methacrylates include methyl methacrylate, ethyl methacrylate, butyl methacrylate, cyclohexyl methacrylate, and octyl methacrylate, and especially preferred is methyl methacrylate. Of these, particularly, a methacrylate, such as methyl methacrylate, is preferably contained as an essential component. More specifically, a methacrylate is preferably contained in an amount of 10% by weight or more, more preferably 15% by weight or more, based on the weight of the graft component (100% by weight) (in the case of the core-shell type polymer, based on the weight of the shell (100% by weight)).

The elastomeric polymer containing a rubber component having a glass transition temperature of 10° C. or lower may be produced by a polymerization method which is any of bulk polymerization, solution polymerization, suspension polymerization, and emulsion polymerization, and the method of copolymerization may be either single-stage grafting or multi-stage grafting. Further, the elastomeric polymer may be a mixture with a copolymer of only a graft component by-produced during the production. Further, as examples of polymerization methods, there can be mentioned a general emulsion polymerization method, a soap-free polymerization method using an initiator, such as potassium persulfate, a seed polymerization method, and a two-stage swelling polymerization method. Further, in the suspension polymerization method, there may be conducted a method in which an aqueous phase and a monomer phase are separately maintained and both are accurately fed to a dispersion mixer of a continuous type so that the particle diameter is controlled by the number of revolutions of the dispersion mixer, and, in the continuous production method, there may be conducted a method in which a monomer phase is passed through an orifice having a diameter as small as several to several tens μm or a porous filter and fed into an aqueous liquid having dispersion ability so as to control the particle diameter, or the like. In the case of a core-shell type graft polymer, with respect to both the core and the shell, the reaction may be of either a single-stage or a multi-stage.

The elastomeric polymer is easily commercially available. Examples of elastomeric polymers having a rubber component comprised mainly of a butadiene rubber, an acrylic rubber, or a butadiene-acryl composite rubber include KaneAce B series (e.g., B-56), manufactured by Kaneka Corporation; METABLEN C series (e.g., C-223A) and W series (e.g., W-450A), manufactured by Mitsubishi Rayon Co., Ltd.; Paraloid EXL series (e.g., EXL-2602), HIA series (e.g., HIA-15), BTA series (e.g., BTA-III), and KCA series, manufactured by Kureha Chemical Industry Co., Ltd.; Paraloid EXL series, and KM series (e.g., KM-336P and KM-357P), manufactured by Rohm & Haas Co.; and UCL Modifier Resin series, manufactured by Ube Cycon, Ltd. (UMG AXS Resin series of UMG ABS, Ltd.), and examples of elastomeric polymers having a rubber component comprised mainly of an acryl-silicone composite rubber include those which are commercially available from Mitsubishi Rayon Co., Ltd. in the trade name of META-BLEN S-2001 or SRK-200.

The amount of the impact modifier contained is preferably 0.2 to 50 parts by weight, preferably 1 to 30 parts by weight, more preferably 1.5 to 20 parts by weight, relative to 100 parts by weight of the resin composition. Such an amount of the impact modifier in the above range is able to impart excellent impact resistance to the composition while suppressing a lowering of the stiffness.

<Thermoplastic Resin (D)>

The thermoplastic resin (D) may have any of a non-crystalline resin and a crystalline resin as a main component, but, among the non-crystalline thermoplastic resins, from the viewpoint of the cost and adhesion, the handling properties of the obtained laminated thermoplastic resin film, and the like, preferred are a polycarbonate resin, a polyester resin, and an acrylic resin. Especially preferred are a polycarbonate resin and an acrylic resin.

As the polycarbonate resin, an aromatic polycarbonate resin is preferred, and may be any of a homopolymer and a copolymer. Further, the aromatic polycarbonate resin may be either of a branched structure or of a linear structure, and further may be a mixture of a branched structure and a linear structure. With respect to the method for producing the aromatic polycarbonate resin used in the invention, any known method, for example, a phosgene method, a transesterification method, or a pyridine method may be used. Representative examples of dihydric phenols used in producing the polycarbonate include bisphenols, and particularly, 2,2-bis(4-hydroxyphenyl)propane, i.e., bisphenol A is preferably used. Further, part of or all of bisphenol A may be replaced by another dihydric phenol. The thermoplastic resins (D) may be used individually or in combination.

With respect to the acrylic resin, as examples of monomers used in the acrylic resin, there can be mentioned the following compounds. Examples include methyl methacrylate, methacrylic acid, acrylic acid, benzyl (meth)acrylate, n-butyl (meth)acrylate, i-butyl (meth)acrylate, t-butyl (meth)acrylate, 2-ethylhexyl (meth)acrylate, lauryl (meth)acrylate, tridecyl (meth)acrylate, stearyl (meth)acrylate, glycidyl (meth)acrylate, hydroxypropyl (meth)acrylate, 2-methoxyethyl (meth)acrylate, 2-ethoxyethyl (meth)acrylate, cyclohexyl (meth)acrylate, isobornyl (meth)acrylate, norbornyl (meth)acrylate, dicyclopentenyl (meth)acrylate, dicyclopentanyl (meth)acrylate, dicyclopentenyloxyethyl (meth)acrylate, tetrahydrofurfuryl (meth)acrylate, acryl (meth)acrylate, 2-hydroxyethyl (meth)acrylate, 2-(meth)acryloyloxyethyl succinate, 2-(meth)acryloyloxyethyl maleate, 2-(meth)acryloyloxyethyl phthalate, 2-(meth)acryloyloxyethyl hexahydrophthalate, pentamethylpiperidyl (meth)acrylate, tetramethylpiperidyl (meth)acrylate, dimethylaminoethyl (meth)acrylate, diethylaminoethyl (meth) acrylate, cyclopentyl methacrylate, cyclopentyl acrylate, cyclohexyl methacrylate, cyclohexyl acrylate, cycloheptyl methacrylate, cycloheptyl acrylate, cyclooctyl methacrylate, cyclooctyl acrylate, cyclododecyl methacrylate, and cyclododecyl acrylate. These may be used in a way such that they are individually homopolymerized or two or more of them are polymerized.

These may be used in a way such that they are individually homopolymerized or two or more of them are polymerized. Particularly, the acrylic resin preferably contains methyl methacrylate and methyl acrylate. The acrylic resin preferably contains, as monomer components, 50 to 99 mol % of methyl methacrylate and 1 to 50 mol % of methyl acrylate, more preferably 60 to 99 mol % of methyl methacrylate and 1 to 40 mol % of methyl acrylate, further preferably 70 to 99 mol % of methyl methacrylate and 1 to 30 mol % of methyl acrylate. When the amount of methyl methacrylate as a monomer component is more than 99 mol %, the resistance to thermal decomposition disadvantageously becomes poor, causing a forming defect, such as silver blister, upon forming. When the amount of methyl methacrylate as a monomer component is less than 50 mol %, the thermal deformation temperature is disadvantageously lowered.

In the thermoplastic resin (D) used in the invention, according to the use, or if necessary, an additive, such as a heat stabilizer, a plasticizer, a light stabilizer, a polymerization metal deactivator, a flame retardant, a lubricant, an antistatic agent, a surfactant, an anti-fungus agent, an ultraviolet light absorber, a release agent, a colorant, or an impact modifier, can be incorporated.

<Multilayer Body>

The multilayer body of the invention can be widely used as a formed article, such as a film, a sheet, or a plate. As a method for forming the multilayer body, a known method, for example, a co-extrusion, extrusion laminating, thermolaminating, or dry laminating method can be used. Of these, a co-extrusion method is especially preferably used.

In the case of co-extrusion, resins constituting the respective layers of a multilayer body, and an additive are flowed and mixed together through a feed block or a multi-manifold die using a plurality of extruders to form a multilayer body. For further improving the multilayer body in strength and impact resistance, the multilayer body obtained in the above-mentioned step can be uniaxially or biaxially stretched by a roll method, a tenter method, a tubular method, or the like.

The multilayer body of the invention preferably has a whole thickness of 0.03 to 300 mm, more preferably 0.05 to 100 mm, further preferably 0.1 to 10 mm, especially preferably 0.5 to 3 mm. The proportion of the total thickness of the layer or layers including the polycarbonate resin (A) in the whole thickness of the multilayer body is preferably 5 to 50%, more preferably 7 to 45%, further preferably 10 to 40%. When the total thickness of the layer or layers including the polycarbonate resin (A) is in the above range, a multilayer body having excellent surface hardness and heat resistance and further having excellent chemical resistance can be provided.

Further, a structure such that the multilayer body has the layer (C) including the resin composition as an outermost layer of the multilayer body and the layer (D) including the thermoplastic resin as at least one inner layer of the multilayer body is preferred because excellent balance between the surface hardness and the chemical resistance is obtained with respect to the both surfaces of the multilayer body.

The multilayer body of the invention has excellent transparency, and preferably has a total light transmittance of 88% or more, more preferably 89% or more, further preferably 90% or more. The total light transmittance is measured using a turbidity meter, Model NDH-2000, manufactured by Nippon Denshoku Industries Co., Ltd.

The multilayer body of the invention which is formed into a film, a sheet, or a plate has excellent transparency, chemical resistance, and heat resistance, and further has excellent resistance to discoloration by UV light and surface hardness. Therefore, the use of the multilayer body of the invention is not particularly limited, but, for example, the multilayer body can be used as a building material, an interior part, a transparent sheet, such as a display cover, a sheet for resin-coated metal sheet, a sheet for forming (such as vacuum or pressure forming, or hot pressing), a colored plate, a transparent plate, a shrink film, a shrink label, a shrink tube, an interior automotive trim, a resin glazing, a member for household appliance, a member for OA machine, and the like.

(Surface Treatment)

The multilayer body of the invention can be subjected to various types of surface treatments. The surface treatment used here indicates a treatment of forming a new layer on the surface of a resin formed article, including vapor deposition (such as physical vapor deposition and chemical vapor deposition), plating (such as electroplating, electroless plating, and melt plating), painting, coating, and printing, and a method generally used can be applied. As examples of surface treatments, specifically, there can be mentioned various types of surface treatments, such as hard coat, water repellent or oil repellent coat, ultraviolet light absorbing coat, infrared light absorbing coat, and metallizing (such as vapor deposition). Hard coat is an especially preferred and required surface treatment.

EXAMPLES

Hereinbelow, the present invention will be described in more detail with reference to the following Examples, which should not be construed as limiting the scope of the invention. In the following Examples, "part(s)" means "part(s) by weight". The resins used and evaluation methods in the Examples are as described below.

1. Polymer Formulation (NMR)

Using JNM-AL400 proton NMR, manufactured by JEOL LTD., the measurement was made with respect to the individual repeating units, and polymer formulation (molar ratio) was calculated.

2. Specific Viscosity

With respect to a solution obtained by dissolving 0.7 g of a polycarbonate resin in 100 ml of methylene chloride at 20° C., a specific viscosity was determined using an Ostwald viscometer.

Specific viscosity $(\eta_{SP})=(t-t_0)/t_0$

[$t_0$ is a drop time (seconds) of methylene chloride, and t is a drop time (seconds) of a sample solution]

3. Glass Transition Temperature (Tg)

Using 8 mg of a polycarbonate resin or an acrylic resin, and using Thermal analysis system DSC-2910, manufactured by TA Instruments, a glass transition temperature was measured under conditions at a temperature elevation rate of 20° C./min in a nitrogen gas atmosphere (nitrogen gas flow rate: 40 ml/min) in accordance with JIS K7121.

4. Total Light Transmittance

A total light transmittance was measured using a turbidity meter, Model NDH-2000, manufactured by Nippon Denshoku Industries Co., Ltd.

5. Surface Hardness

In accordance with JIS K5400, in a thermostatic chamber at an atmosphere temperature of 23° C., with respect to the surface of the first layer (on the layer (C) side including the resin composition) of a multilayer body sample cut into 80 mm×60 mm, a line was drawn using a pencil in a state such that an angle of 45 degrees was maintained and a load of 750 g was applied, and the state of the surface was visually evaluated.

6. Adhesion

In an MIT test similar to JIS P8115, a multilayer body sample was repeatedly bent, and the cross-section of the sample obtained after breakage was visually examined, and rated in respect of peeling between the layers according to the following criteria.

○: No peeling occurs.

Δ: Peeling occurs, and a dry spot is found at the interface.

x: Peeling occurs, and no dry spot is found at the interface.

7. Chemical Resistance

With reference to non-patent literature 1, a generally commercially available sunscreen cream (Mentholatum SKIN AQUA SPF 27, manufactured by Rohto Pharmaceutical Co., Ltd.) was uniformly applied to the surface of a multilayer body sample (on the layer (C) side including the resin composition), and subjected to heat treatment at 80° C. for 2 hours, and then the sample was wiped using cloth and thereafter the appearance of the resultant film surface was visually examined.

○: The sunscreen cream can be completely wiped from the sample, and the sample is not affected.

Δ: The sunscreen cream can be wiped from the sample, but the sample is affected.

x: It is difficult to wipe the sunscreen cream from the sample, or the sample suffers whitening.

[Polycarbonate Resin (A)]

ISS-PC1 (Example)

Structural units derived from isosorbide (hereinafter, referred to as "ISS")/structural units derived from 3,9-bis (2-hydroxy-1,1-dimethylethyl)-2,4,8,10-tetraoxaspiro(5,5) undecane (hereinafter, referred to as "SPG")=70/30 (mol %); specific viscosity: 0.344

ISS-PC2 (Example)

Structural units derived from ISS/structural units derived from SPG=90/10 (mol %); specific viscosity: 0.399

ISS-PC3 (Example)

Structural units derived from ISS/structural units derived from SPG/1,9-nonanediol (hereinafter, referred to as "ND") =75/20/5 (mol %); specific viscosity: 0.362

ISS-PC4 (Example)

Structural units derived from ISS/structural units derived from SPG/structural units derived from 1,4-cyclohexanedimethanol (hereinafter, referred to as "CHDM")=55/35/10 (mol %); specific viscosity: 0.341

ISS-PC5 (Comparative Example)

Structural units derived from ISS/structural units derived from SPG/structural units derived from 1,4-cyclohexanedimethanol (hereinafter, referred to as "CHDM")=85/3/12 (mol %); specific viscosity: 0.361

ISS-PC6 (Comparative Example)

Structural units derived from ISS/structural units derived from CHDM=70/30 (mol %); specific viscosity: 0.388

ISS-PC7 (Comparative Example)

Structural units derived from ISS/structural units derived from CHDM=50/50 (mol %); specific viscosity: 0.397

ISS-PC8 (Comparative Example)

Structural units derived from ISS/structural units derived from SPG=32/68 (mol %); specific viscosity: 0.344

PC-A (Example and Comparative Example)

Trade name: Panlite, manufactured by Teijin Limited; viscosity average molecular weight=25,000

[Acrylic Resin (B)]

PMMA (Example and Comparative Example)

ACRYPET VH-001, manufactured by Mitsubishi Rayon Co., Ltd. (copolymer acrylic resin of methyl methacrylate and methyl acrylate)

Example 1

<Production of Polycarbonate Resin A>

354 Parts of isosorbide (hereinafter, abbreviated to "ISS"), 316 parts of 3,9-bis(2-hydroxy-1,1-dimethylethyl)-2,4,8,10-tetraoxaspiro(5,5)undecane (hereinafter, abbreviated to "SPG"), 750 parts of diphenyl carbonate (hereinafter, abbreviated to "DPC"), and $0.8 \times 10^{-2}$ part of tetramethyl-ammonium hydroxide and $0.6 \times 10^{-4}$ part of barium stearate as a catalyst were melted in a nitrogen gas atmosphere by heating to 200° C. Then, the temperature was increased to 220° C. and the degree of vacuum was adjusted to 20.0 kPa over 30 minutes. Then, the temperature was increased to 240° C. and the degree of vacuum was adjusted to 10 kPa over another 30 minutes. That temperature was maintained for 10 minutes, and then the degree of vacuum was reduced to 133 Pa or less over one hour. After completion of the reaction, the resultant mixture was discharged from the bottom of the reaction vessel under a pressure of nitrogen gas and, while cooling using a water bath, cut by means of a pelletizer to obtain pellets (ISS-PC1).

<Production of a Resin Composition>

Using the obtained ISS-PC1 and an acrylic resin PMMA (ACRYPET VH-001, manufactured by Mitsubishi Rayon Co., Ltd.), the resins were individually dried at 80° C. for 12 hours or longer, and then mixed in a weight ratio of 80:20, and then melt-kneaded by means of a vented twin-screw extruder [KZW15-25MG, manufactured by Technovel Corporation] in which both the cylinder and dice were at 230° C., obtaining pellets of a resin composition of the acrylic resin and the polycarbonate resin. With respect to the obtained pellets, evaluations of the above items were made. The results of the evaluations were shown in Table 1.

<Production of a Laminate>

As a thermoplastic resin, an acrylic resin PMMA (trade name: ACRYPET VH-001, manufactured by Mitsubishi Rayon Co., Ltd.) was melted by a single-screw extruder having a screw diameter of 40 mm, and the resin composition pellets for forming a resin composition (C) layer, which were prepared by the above-mentioned method, were melted by a single-screw extruder having a screw diameter of 30 mm, and three layers of the two types of resins were laminated by a multi-manifold method, and the acrylic resin was extruded through a T-dice at a set temperature of 250° C. and the resin composition was extruded through a T-dice at a set temperature of 240° C., and the resultant sheet was cooled using a planished roll to obtain a laminate having the resin composition (C) laminated on both surfaces of the acrylic resin. Further, in this instance, the delivery rates for the molten resins were controlled so that the thicknesses of the layers became as follows: the first layer (resin composition (C) layer)/the second layer (acrylic resin (D) layer)/the third layer (resin composition (C) layer)=0.1/1.0/0.1 (mm). The results of the evaluations made with respect to the obtained laminate were shown in Table 1.

Example 2

<Production of a Resin Composition>

Substantially the same procedure as in Example 1 was conducted except that the blend weight ratio for the extrusion was changed to ISS-PC1:PMMA=90/10, and the same evaluations were made. The results were shown in Table 1.

<Production of a Laminate>

Substantially the same procedure as in Example 1 was conducted except that the resin composition resin (C) was extruded through a T-dice at a set temperature of 250° C., and the same evaluations were made. The results were shown in Table 1.

Example 3

<Production of a Polycarbonate Resin>

Substantially the same procedure as in Example 1 was conducted except that 455 parts of ISS, 105 parts of SPG, and 750 parts of DPC were used as raw materials (ISS-PC2).

<Production of a Resin Composition>

Substantially the same procedure as in Example 1 was conducted except that the blend weight ratio for the extrusion was changed to ISS-PC2:PMMA=50/50, and the same evaluations were made. The results were shown in Table 1.

<Production of a Laminate>

Substantially the same procedure as in Example 1 was conducted except that the resin composition (C) was extruded through a T-dice at a set temperature of 250° C., and two layers of the two types of resins were laminated by a multi-manifold method, and the delivery rates for the molten resins were controlled so that the thicknesses of the layers became as follows: the first layer (resin composition (C) layer)/the second layer (acrylic resin (D) layer)=0.1/1.0 (mm), and the same evaluations were made. The results were shown in Table 1.

Example 4

Substantially the same procedure as in Example 1 was conducted except that 380 parts of ISS, 211 parts of SPG, 28 parts of ND, and 750 parts of DPC were used as raw materials, and the same evaluations were made (ISS-PC3).

<Production of a Resin Composition>

Substantially the same procedure as in Example 1 was conducted except that the blend weight ratio for the extrusion was changed to ISS-PC3:PMMA=70/30, and the same evaluations were made. The results were shown in Table 1.

<Production of a Laminate>

Substantially the same procedure as in Example 3 was conducted except that the resin composition (C) was extruded through a T-dice at a set temperature of 240° C., and the same evaluations were made. The results were shown in Table 1.

Example 5

Substantially the same procedure as in Example 1 was conducted except that 278 parts of ISS, 369 parts of SPG, 50 parts of CHDM, and 750 parts of DPC were used as raw materials, and the same evaluations were made (ISS-PC4).

<Production of a Resin Composition>

Substantially the same procedure as in Example 1 was conducted except that the blend weight ratio for the extrusion was changed to ISS-PC4:PMMA=95/5, and the same evaluations were made. The results were shown in Table 1.

<Production of a Laminate>

The same procedure as in Example 3 was conducted, and the same evaluations were made. The results were shown in Table 1.

Example 6

<Production of a Resin Composition>

Substantially the same procedure as in Example 1 was conducted except that the blend weight ratio for the extrusion was changed to ISS-PC1:PMMA=70/30, and the same evaluations were made. The results were shown in Table 1.

<Production of a Laminate>

As a thermoplastic resin, an aromatic polycarbonate resin: trade name: Panlite (PC-A), manufactured by Teijin Limited, was melted by a single-screw extruder having a screw diameter of 40 mm, and the resin composition pellets for forming a resin composition (C) layer, which were prepared by the above-mentioned method, were melted by a single-screw extruder having a screw diameter of 30 mm, and three layers of the two types of resins were laminated by a multi-manifold method, and the aromatic polycarbonate resin was extruded through a T-dice at a set temperature of 290° C. and the resin composition was extruded through a T-dice at a set temperature of 240° C., and the resultant sheet was cooled using a planished roll to obtain a laminate having the resin composition (C) laminated on both surfaces of the aromatic polycarbonate resin. Further, in this instance, the delivery rates for the molten resins were controlled so that the thicknesses of the layers became as follows: the first layer (resin composition (C) layer)/the second layer (aromatic polycarbonate resin (D) layer)/the third layer (resin composition (C) layer)=0.1/1.0/0.1 (mm). The results of the evaluations made with respect to the obtained laminate were shown in Table 1.

Example 7

<Production of a Laminate>

Substantially the same procedure as in Example 3 was conducted except that, as the thermoplastic resin (D), an aromatic polycarbonate resin: trade name: Panlite (PC-A), manufactured by Teijin Limited, was used and extruded through a T-dice at a set temperature of 290° C., and the same evaluations were made. The results were shown in Table 1.

Comparative Example 1

<Production of a Resin Composition>

Substantially the same procedure as in Example 2 was conducted except that the blend weight ratio for the extrusion was changed to ISS-PC1:PMMA=30/70, and the same evaluations were made. The results were shown in Table 2.

<Production of a Polycarbonate Resin Laminate>

Substantially the same procedure as in Example 3 was conducted except that the resin composition (C) was extruded through a T-dice at a set temperature of 230° C., and two layers of the two types of resins were laminated by a multi-manifold method, and the delivery rates for the molten resins were controlled so that the thicknesses of the layers became as follows: the first layer (resin composition (C) layer)/the second layer (acrylic resin (D) layer)=0.1/1.0 (mm), and the same evaluations were made. The results of the evaluations made with respect to the obtained laminate were shown in Table 2. The obtained laminate had so poor chemical resistance that it was not able to achieve the intended aim.

Comparative Example 2

<Production of a Polycarbonate Resin>

Substantially the same procedure as in Example 1 was conducted except that 430 parts of ISS, 32 parts of SPG, 60 parts of CHDM, and 750 parts of DPC were used as raw materials (ISS-PC5).

<Production of a Resin Composition>

Substantially the same procedure as in Example 1 was conducted except that the blend weight ratio for the extrusion was changed to ISS-PC5:PMMA=70/30, and the same evaluations were made. The results were shown in Table 2. The obtained resin composition pellets suffered whitening, and it is apparent that the resins in the composition were not compatibilized, and the resin composition could not be practically used.

Comparative Example 3

<Production of a Polycarbonate Resin>

Substantially the same procedure as in Example 1 was conducted except that 354 parts of ISS, 150 parts of CHDM, and 750 parts of DPC were used as raw materials (ISS-PC6).

<Production of a Resin Composition>

Substantially the same procedure as in Example 1 was conducted except that the blend weight ratio for the extrusion was changed to ISS-PC6:PMMA=70/30, and the same evaluations were made. The results were shown in Table 2. The obtained resin composition pellets suffered whitening, and it is apparent that the resins in the composition were not compatibilized, and the resin composition could not be practically used.

Comparative Example 4

<Production of a Polycarbonate Resin>

Substantially the same procedure as in Example 1 was conducted except that 253 parts of ISS, 250 parts of CHDM, and 750 parts of DPC were used as raw materials (ISS-PC7).

<Production of a Resin Composition>

Substantially the same procedure as in Example 1 was conducted except that the blend weight ratio for the extrusion was changed to ISS-PC7:PMMA=70/30, and the same evaluations were made. The results were shown in Table 2. The obtained resin composition pellets suffered whitening, and it is apparent that the resins in the composition were not compatibilized, and the resin composition could not be practically used.

Comparative Example 5

<Production of a Laminate>

Substantially the same procedure as in Example 3 was conducted except that ISS-PC6 was used in the resin layer (C), and the same evaluations were made. The results were shown in Table 2. The obtained laminate had so poor adhesion that it was not able to achieve the intended aim.

Comparative Example 6

<Production of a Laminate>

Substantially the same procedure as in Example 3 was conducted except that ISS-PC7 was used in the resin layer (C), and the same evaluations were made. The results were shown in Table 2. The obtained laminate had so poor surface hardness, adhesion, and chemical resistance that it was not able to achieve the intended aim.

Comparative Example 7

<Production of a Laminate>

Substantially the same procedure as in Example 7 was conducted except that ISS-PC6 was used in the resin layer (C), and the same evaluations were made. The results were shown in Table 2. The obtained laminate had so poor adhesion that it was not able to achieve the intended aim.

Comparative Example 8

<Production of a Laminate>

Substantially the same procedure as in Example 7 was conducted except that ISS-PC7 was used in the resin layer (C), and the same evaluations were made. The results were shown in Table 2. The obtained laminate had so poor surface hardness and chemical resistance that it was not able to achieve the intended aim.

Comparative Example 9

<Production of a Polycarbonate Resin>

Substantially the same procedure as in Example 1 was conducted except that 162 parts of ISS, 717 parts of SPG, and 750 parts of DPC were used as raw materials (ISS-PC8).

<Production of a Laminate>

Substantially the same procedure as in Example 7 was conducted except that ISS-PC8 was used in the resin layer (C), and the same evaluations were made. The results were shown in Table 2. The obtained laminate had so poor chemical resistance that it was not able to achieve the intended aim.

TABLE 1

|  |  |  | Example 1 | Example 2 | Example 3 | Example 4 |
|---|---|---|---|---|---|---|
| Layer construction | Resin composition (C) |  | ISS-PC1/ PMMA | ISS-PC1/ PMMA | ISS-PC2/ PMMA | ISS-PC3/ PMMA |
|  | Thermoplastic resin (D) |  | PMMA | PMMA | PMMA | PMMA |
|  | Resin composition (C) |  | ISS-PC1/ PMMA | ISS-PC1/ PMMA | — | — |
| ISS-PC Formulation (a1/a2) | mol % |  | ISS/SPG = 70/30 | ISS/SPG = 70/30 | ISS/SPG = 90/10 | ISS/SPG/ND = 75/20/5 |
| Mass ratio for resin composition (A/B) | wt % |  | 80/20 | 90/10 | 50/50 | 70/30 |
| Total light transmittance | % |  | 92 | 92 | 92 | 92 |
| Tg of resin composition | ° C. |  | 130 | 134 | 131 | 115 |
| Surface hardness (Outermost layer) | — |  | H | H | 2 H | H |
| Adhesion | — |  | ○ | Δ | ○ | ○ |
| Chemical resistance | — |  | ○ | ○ | Δ | ○ |

|  |  |  | Example 5 | Example 6 | Example 7 |
|---|---|---|---|---|---|
| Layer construction | Resin composition (C) |  | ISS-PC4/ PMMA | ISS-PC1/ PMMA | ISS-PC2/ PMMA |
|  | Thermoplastic resin (D) |  | PMMA | PC-A | PC-A |
|  | Resin composition (C) |  | — | ISS-PC1/ PMMA | — |
| ISS-PC Formulation (a1/a2) | mol % |  | ISS/SPG/CHDM = 55/35/10 | ISS/SPG = 70/30 | ISS/SPG = 90/10 |
| Mass ratio for resin composition (A/B) | wt % |  | 95/5 | 70/30 | 50/50 |

TABLE 1-continued

|  |  |  |  |  |
|---|---|---|---|---|
| Total light transmittance | % | 92 | 90 | 90 |
| Tg of resin composition | ° C. | 126 | 125 | 131 |
| Surface hardness (Outermost layer) | — | H | H | 2 H |
| Adhesion | — | Δ | ○ | ○ |
| Chemical resistance | — | Δ | ○ | Δ |

TABLE 2

|  |  | Comparative Example 1 | Comparative Example 2 | Comparative Example 3 | Comparative Example 4 | Comparative Example 5 |
|---|---|---|---|---|---|---|
| Layer construction | Resin composition (C) | ISS-PC1/ PMMA | ISS-PC5/ PMMA | ISS-PC6/ PMMA | ISS-PC7/ PMMA | ISS-PC6 |
|  | Thermoplastic resin (D) | PMMA | PMMA | PMMA | PMMA | PMMA |
|  | Resin layer (C) | — | — | — | — | — |
| ISS-PC Formulation (a1/a2) | mol % | ISS/SPG = 70/30 | ISS/SPG/CHDM = 85/3/12 | ISS/CHDM = 70/30 | ISS/CHDM = 50/50 | ISS/CHDM = 70/30 |
| Mass ratio for resin composition (A/B) | wt % | 30/70 | 70/30 | 70/30 | 70/30 | — |
| Tg of resin composition | ° C. | 107 | 115/105 | 117/106 | 96/108 | 120 |
| Total light transmittance | % | 92 | 75 | 76 | 75 | 92 |
| Surface hardness (Outermost layer) | — | 2 H | Resin composition whitened | Resin composition whitened | Resin composition whitened | F |
| Adhesion | — | ○ | — | — | — | X |
| Chemical resistance | — | X | — | — | — | ○ |

|  |  | Comparative Example 6 | Comparative Example 7 | Comparative Example 8 | Comparative Example 9 |
|---|---|---|---|---|---|
| Layer construction | Resin composition (C) | ISS-PC7 | ISS-PC6 | ISS-PC7 | ISS-PC8 |
|  | Thermoplastic resin (D) | PMMA | PC-A | PC-A | PC-A |
|  | Resin layer (C) | — | — | — | — |
| ISS-PC Formulation (a1/a2) | mol % | ISS/CHDM = 50/50 | ISS/CHDM = 70/30 | ISS/CHDM = 50/50 | ISS/SPG = 32/68 |
| Mass ratio for resin composition (A/B) | wt % | — | — | — | — |
| Tg of resin composition | ° C. | 101 | 120 | 101 | 111 |
| Total light transmittance | % | 92 | 90 | 90 | 90 |
| Surface hardness (Outermost layer) | — | HB | F | HB | H |
| Adhesion | — | X | X | ○ | ○ |
| Chemical resistance | — | X | ○ | X | X |

INDUSTRIAL APPLICABILITY

The multilayer body of the present invention is advantageously used as a building material, an interior part, a transparent sheet, such as a display cover, a sheet for resin-coated metal sheet, a sheet for forming (such as vacuum or pressure forming, or hot pressing), a colored plate, a transparent plate, a shrink film, a shrink label, a shrink tube, an interior automotive trim, a resin glazing, a member for household appliance, or a member for OA machine.

The invention claimed is:

1. A multilayer body comprising:
at least one layer (C) comprising a resin composition; and
at least one layer (D) comprising a thermoplastic resin,
wherein the resin composition comprises a polycarbonate resin (A) and an acrylic resin (B) in a weight ratio of 40:60 to 99:1,
wherein the acrylic resin (B) is obtained by a process consisting of polymerizing 50 to 99 mol % of methyl methacrylate and 1 to 50 mol % of methyl acrylate,
wherein the acrylic resin (B) has a glass transition temperature of 90 to 150° C.,
wherein the polycarbonate resin (A) comprises, as main repeating units, a unit (a-1) represented by the following formula (a-1):

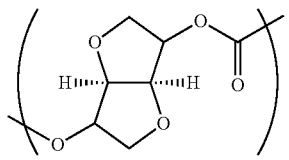 (a-1)

and a unit (a-2) represented by the following formula (a-2):

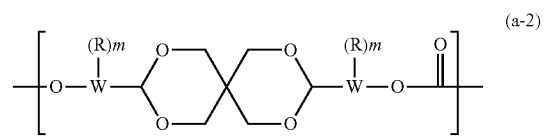 (a-2)

wherein W represents an alkylene group having 1 to 20 carbon atoms or a cycloalkylene group having 6 to 20 carbon atoms, R represents a branched or linear alkyl group having 1 to 20 carbon atoms, or a cycloalkyl group having 6 to 20 carbon atoms and optionally having a substituent, and m represents an integer of 0 to 10, and
wherein a molar ratio (a-1/a-2) of the unit (a-1) to the unit (a-2) is 40/60 to 95/5.

2. The multilayer body according to claim 1, wherein an outermost layer is one of the at least one layer (C) and at least one inner layer is one of the at least one layer (D).

3. The multilayer body according to claim 1, wherein the at least one layer (C) has a glass transition temperature in the range of 90 to 150° C.

4. The multilayer body according to claim 1, wherein the unit (a-2) of the polycarbonate resin (A) is a unit derived from 3,9-bis(2-hydroxy-1,1-dimethylethyl)-2,4,8,10-tetraoxaspiro(5.5)undecane.

5. The multilayer body according to claim 1, wherein the polycarbonate resin (A) has a specific viscosity of 0.2 to 1.5.

6. The multilayer body according to claim 1, wherein the at least one layer (D) is at least one layer comprising an acrylic resin or a polycarbonate resin.

7. The multilayer body according to claim 1, wherein a total thickness of the at least one layer (C) is 5 to 50% of a whole thickness of the multilayer body.

8. The multilayer body according to claim 1, which has a whole thickness of 0.03 to 300 mm.

* * * * *